No. 756,003. PATENTED MAR. 29, 1904.
W. D. DE LAMARTER & J. A. MACDONALD.
WIRE DRAWING APPARATUS.
APPLICATION FILED SEPT. 11, 1903.
NO MODEL.

WITNESSES:
INVENTORS
William D. De Lamarter
James A. Macdonald
BY
Duncan & Duncan
ATTORNEYS No. 756,003. Patented March 29, 1904.

UNITED STATES PATENT OFFICE.

WILLIAM D. DE LAMARTER, OF ELIZABETH, NEW JERSEY, AND JAMES A. MACDONALD, OF FLUSHING, NEW YORK, ASSIGNORS TO WACLARK WIRE COMPANY, OF NEW YORK, N. Y., A CORPORATION OF NEW JERSEY.

WIRE-DRAWING APPARATUS.

SPECIFICATION forming part of Letters Patent No. 756,003, dated March 29, 1904.

Application filed September 11, 1903. Serial No. 172,785. (No model.)

*To all whom it may concern:*

Be it known that we, WILLIAM D. DE LAMARTER, a resident of Elizabeth, in the county of Union and State of New Jersey, and JAMES A. MACDONALD, a resident of Flushing, in the county of Queens and State of New York, citizens of the United States, have invented certain new and useful Improvements in Wire-Drawing Apparatus, of which the following is a specification, taken in connection with the accompanying drawings, which form a part of the same.

This invention relates to wire-drawing apparatus, and relates especially to the construction of wire-reels and the mounting of the same.

Figure 1:
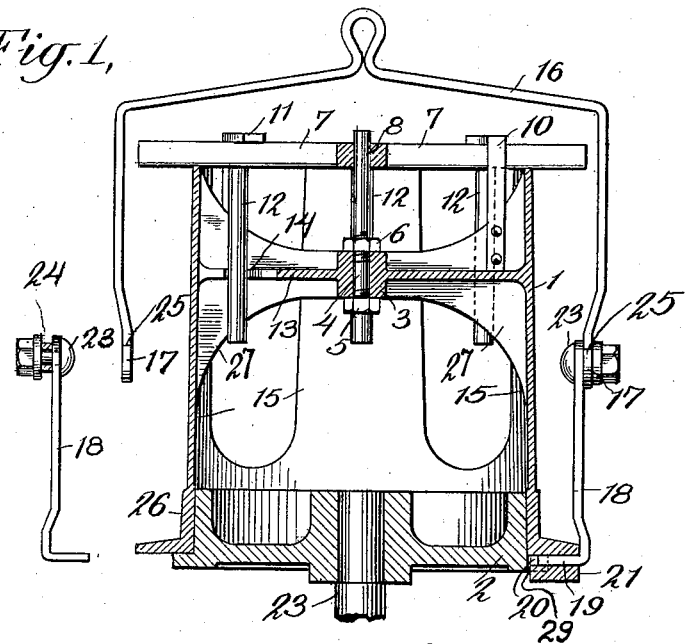
Figure 2:
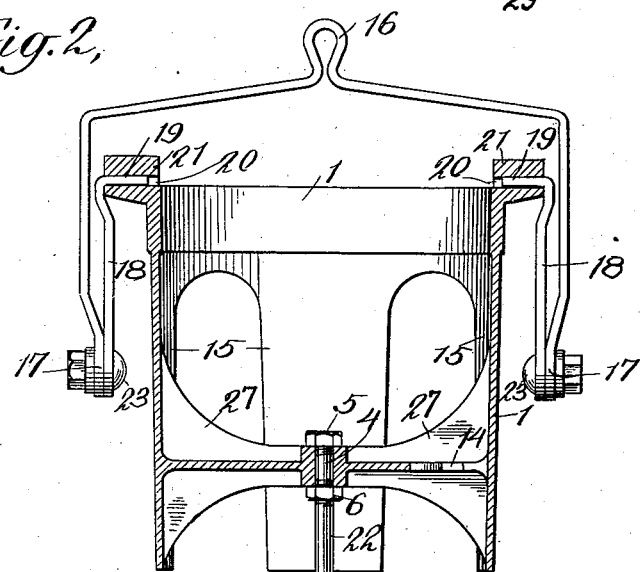

In the accompanying drawings, in which the same reference-numeral refers to the same part in both figures, Figure 1 is a vertical sectional view showing an embodiment of this invention. Fig. 2 is a similar view showing the same in inverted position and the parts disengaged.

In the embodiment of this invention illustrated the driving-shaft 23 has rigidly secured to its upper portion the driving-drum 2, formed with the supporting-flange indicated. The reel 1 is removably mounted on the drum and is provided with the driving-lugs 21, which engage suitable peripheral recesses 29 in the flange of the drum, so that the reel is rotated with the drum in the normal operation of the apparatus. The reel is preferably formed with a continuous winding-rim 26, having an edge flange at the lower portion of the same upon which the wire is wound in the usual way and crowded upward as it accumulates. The body of the reel is preferably given a skeleton form, the ribs 15 extending upward and being connected by the braces 27 and 13, which meet in the central boss 3.

The reel is preferably provided with a releasable reel-head, suitable means being provided on the reel and head to firmly secure the head to the reel during the operation of the apparatus and to readily detach the same therefrom when desired. The reel-head is indicated in Fig. 2 as being formed of a plurality of arms 7, secured together and having the guides 12 fixed thereto in such a way as to form a skeleton wire-support. The handle 9 may be formed on one of the arms, if desired. The stud 22 is indicated as axially mounted on the reel by means of the nuts 5 and 6, which secure the stud to the boss 3, the portion 4 of the stud passing through a suitable aperture in the boss. The reel-head is formed with the stud-hole 8 to coöperate with the stud, and suitable retainers are provided on the reel to firmly hold the head thereto. The retainers 10 are shown in Fig. 1 as bolted to the reel, the upper hooked portions 11 of these retainers extending circumferentially in opposite directions, so that when the arms are rotated under them they firmly secure the head to the reel, the guides under these circumstances fitting within suitable recesses 14, formed in the members 13.

The reel and head are preferably invertible and suitable means are provided to remove them from the drum and support them while they are being entirely or partly inverted to remove the wire. The trunnion-bars 18 may be employed for this purpose, the bent ends 19 of these bars fitting within the rectangular trunnion-sockets 20 in the driving-lugs of the reel and firmly supporting the trunnions, which may be in the form of freely-movable rolls 24, secured by the bolts 23 or otherwise to the bars. The yoke 16 is preferably formed with the open hooks 17 at either end, the ends 25 of these hooks readily fitting around the trunnions, so that the reel and head may be readily lifted from the drum and inverted into the position indicated in Fig. 2, whereupon the head may be readily released from the reel.

In operating this wire-drawing apparatus the wire is received on the winding-flange and gradually crowded therefrom as the operation proceeds until the entire coil of wire is on the reel. Then the rotation of the reel is stopped, the trunnion-bars inserted, and the yoke removes the reel from the drum, so that the reel may be inverted. The wire under these conditions falls downward upon the reel-head, so that when the head is released from the reel the coil of wire is supported by the head and may be readily removed for further treatment, while the reel may be replaced on the drum and the drawing operation resumed after the head has been again secured to the reel.

It is of course understood that many modifications may be made in the form, proportion, and numbers of parts of this apparatus, parts of the same may be used in connection with other devices, and parts may be used without employing all of the same without departing from the spirit of this invention or losing the advantages of the same. We do not, therefore, desire to be limited to the details of the disclosure which we have made in this case; but

What we claim as new, and what we desire to secure by Letters Patent, is set forth in the appended claims:

1. In wire-drawing apparatus, a driving-shaft, a drum having peripheral recesses mounted thereon, a reel having a continuous winding-rim removably engaging said drum and having driving-lugs engaging said recesses, an axial stud mounted on said reel, hooked retainers on said reel, a reel-head having arms releasably engaging said retainers and having a stud-hole to be engaged by said stud, guides on said head, detachable trunnion-bars having trunnions thereon engaging trunnion-sockets in said reel and a yoke to engage said trunnions to invert said reel.

2. In wire-drawing apparatus, a driving-drum, a reel removably engaging said drum to be rotated thereby, a stud mounted on said reel, hooked retainers on said reel, a reel-head having arms engaging said retainers and having a stud-hole to be engaged by said stud and means to invert said reel.

3. In wire-drawing apparatus, driving means, a reel removably engaging said means to be rotated thereby and having trunnion-sockets, a reel-head releasably secured to said reel, detachable trunnions-bars to engage said sockets and having trunnions thereon and a yoke to engage said trunnions to invert said reel.

4. In wire-drawing apparatus, driving means, a reel removably engaging said means to be rotated thereby, a reel-head releasably secured to said reel and means to invert said reel to remove wire therefrom.

5. In wire-drawing apparatus, driving means, a reel removably engaging said driving means to be rotated thereby and a reel-head having a greater diameter than the winding-rim of said reel releasably secured to said reel to retain wire thereon.

6. In wire-drawing apparatus, driving means, a reel removably engaging said driving means to be rotated thereby, said reel having trunnion-sockets and detachable trunnion-bars having trunnions thereon to engage said sockets to invert said reel to remove wire therefrom.

7. In wire-drawing apparatus, driving means, a reel removably engaging said driving means to be rotated thereby, said reel having a continuous winding-rim, a reel-head releasably secured to said reel and means to invert said reel to remove wire therefrom.

8. In wire-drawing apparatus, driving means, a reel removably engaging said means to be rotated thereby, said reel having a continuous winding-rim and means to invert said reel to remove wire therefrom.

9. In wire-drawing apparatus, driving means, a reel having a continuous winding-rim, removably engaging said means to be rotated thereby, and means to remove said reel from said driving means to remove the wire.

10. In wire-drawing apparatus, driving means and a reel having a continuous winding-rim removably engaging said means to be rotated thereby, said reel being invertible to remove wire therefrom.

WILLIAM D. DE LAMARTER.
JAMES A. MACDONALD.

Witnesses:
THOMAS WALLACE,
F. W. WALLACE.